B. DYSART.
DENTAL APPLIANCE.
APPLICATION FILED MAY 10, 1918.

1,306,689.

Patented June 17, 1919.

Attest.
Charles A. Becker

Inventor
Birney Dysart,
by Rippey & Kingsland
His Attorneys.

UNITED STATES PATENT OFFICE.

BIRNEY DYSART, OF CINCINNATI, OHIO.

DENTAL APPLIANCE.

1,306,689.  Specification of Letters Patent.  Patented June 17, 1919.

Application filed May 10, 1918. Serial No. 233,705.

*To all whom it may concern:*

Be it known that I, BIRNEY DYSART, a citizen of the United States, residing at the city of Cincinnati, county of Hamilton, and State of Ohio, have invented a new and useful Dental Appliance, of which the following is a specification.

This invention relates to dental appliances.

The invention has particular reference to a dental appliance of that type which supports a quantity of dental floss or similar material adapted to be stretched between a pair of movable arms so that the floss may be inserted between the teeth and oscillated in order to remove any substance or accretions therefrom.

The device of the present invention includes a pair of arms having pivotal arrangement relative to a spool of dental floss or thread and provided with means whereby the floss or thread may be attached to the ends of the arms, and a device for imparting pressure to the arms whereby the dental floss or thread will be stretched properly for use.

The general and specific construction and mode of operation and the various objects and advantages attained by my present invention will appear from the following description in which reference is made to the accompanying drawing illustrating a preferred embodiment of the invention, and in which—

Figure 3:
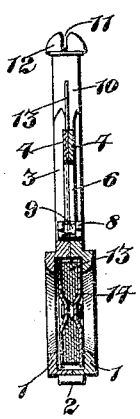
Fig. 3 is a longitudinal sectional view illustrating the spool containing the dental floss or thread, and the means by which it is held in position.
Figure 4:
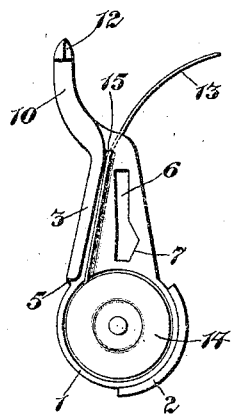
Fig. 4 is a view of one of the arms detached from the other one and having the spool of dental floss in connection therewith.
Figure 5:
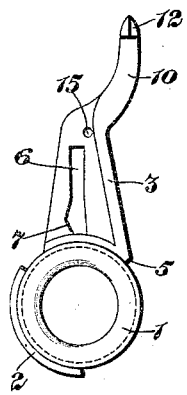
Fig. 5 is a view of the other arm.
Figure 6:
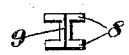
Fig. 6 is an elevation of the actuating device by which the arms are moved to stretch and relax the dental floss.

The embodiment of my invention illustrated in the drawing includes two duplicate parts adapted to be superimposed upon each other and to embrace between them a spool or holder containing a quantity of dental floss or thread. As shown each of said parts includes an annular recessed portion 1 so that when the two parts of the device are superimposed a chamber or magazine is formed by the matching recesses, as will be readily understood by reference to Fig. 3. One edge of each of the annular portions 1 is formed with an arcuate flange 2 which engages the edge of the annular portion of the other member and constitutes means to prevent the two members from slipping out of position when they are placed together. Each member also includes an arm 3 and a projecting rib or flange 4. The ribs or flanges 4 are arranged to overlap when the two members of the appliance are placed together. Turning movement of the two members in opposite directions is limited by contact of the flanges 2 with shoulders 5 at the point of union of the arms 3 with the magazine portions 1; and turning movement of the arms toward each other is limited by contact of the flanges 4 with the arms and also by the ends of the flanges 2 coming into contact with each other. Each of the flanges 4 is provided with a slot 6, the same extending outwardly from the inner ends of the flanges. The slots 6 are so arranged that they do not lie in parallel planes in any position of the arms 3, but lie in planes which intersect. One wall of each of the slots 6 is notched near its inner end as shown at 7, thus forming enlargements in the slots so that when the two arms 3 are in the positions which they occupy when they are moved to the full extent of their movement away from each other, the enlarged portions of the slots are in registration which is for the purpose of permitting the actuating device to be mounted in connection with the arms within the slots.

Figure 1:
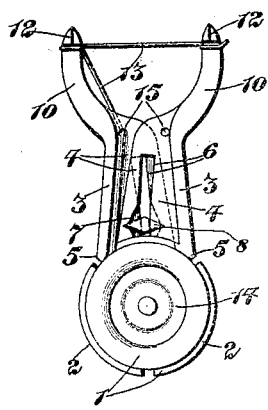
Figure 1 is an elevation of the appliance having the dental floss stretched on the arms thereof ready for use.
Figure 2:
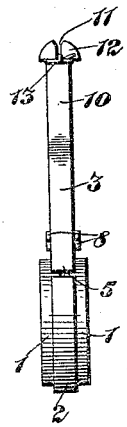
Fig. 2 is an elevation looking toward one of the side edges of the appliance.

The actuating device shown includes two heads 8 united by an integral connection 9. The actuating device may be placed in connection with the arms by passing one of the heads through the enlarged opening formed as a result of moving the arms 3 to the full extent of their movement away from each other, in which position the inner ends of the slots 6 and the notches 7 are in registration thus producing an opening of sufficient size to permit one of the heads 8 of the uniting device to pass through the opening. This, of course, requires that the head be passed lengthwise through the opening for the reason that the length of the head is considerably in excess of the width of the opening, but is less than the length of the opening so formed; and the width of the head is only slightly less than the width of the opening so formed. After one of the heads has been passed through the opening formed in the manner described, the actuating device is turned to the position shown in Fig. 1 in which the heads extend transversely across the slots 6 and in which the width of the connection 9 prevents the same from turning in the slots. Thus the actuating device may be moved longitudinally of the arms 3 and will be prevented from turning because the width of the connection 9 is somewhat greater than the width of the slots 6, with the exception of that portion of the slots formed by the notches 7. Since the slots 6 are in intersecting planes, movement of the actuating device therein toward the outer ends of said slots will move the arms 3 toward each other; and movement of the actuating device toward the inner ends of the slots 6 will move the arms away from each other.

The outer end of each of the arms 3 consists of a curved portion 10. The portions 10 are divergingly curved. The outer end of each of the portions 10 is split or slotted as shown at 11 and is also provided with a head or enlargement 12. This conformation provides for the facile engagement of the floss or thread.

In the construction illustrated a quantity of the floss or thread 13 is wound upon a spool 14 of a size fitting properly within the magazine formed by the matching recesses in the recessed annular portions 1. The spool is revoluble and the loose end of the floss or thread is passed between the two parts 1 of the magazine alongside of one of the arms 3 and through a hole 15 near the outer extremity of one of the flanges 4; thence the floss or thread is extended to the extremity of one of the curved extensions 10 and through the slot 11, and is then passed one or more times around the arm adjacent to the head. Thence the floss or thread is extended across to the other arm and is secured thereto in a similar manner. It will be understood, of course, that it is entirely immaterial whether the extreme end of the dental floss is secured to one of the arms first and the intermediate portion of the floss is secured to the arm thereafter, it only being important that the floss or thread be properly connected to the arms so that when the actuator is moved to spread the arms apart the floss or thread will be stretched. In this connection it will be understood, of course, that the attachment of the thread between the arms is effected while the two arms are near each other so that when the actuator is moved inwardly the arms will be spread apart and the floss or thread will be stretched thereby.

The walls of the magazine as shown are formed with relatively large holes or openings therethrough so that the spool may be engaged by the fingers of the hand and turned in order to wind up any of the loose floss or thread.

The device may be constructed of any desired material whether of wood, metal or any artificial or fabricated substance. In some instances it is preferred to construct the device of a plastic substance such, for example, as any of the substances commercially known as vulcanite, bakelite or celluloid so that the arms will possess a desired degree of resiliency. This is an advantageous feature though it is not essential, and I do not restrict myself to the use of plastic substance except where specified in the claims. It will also be understood that I contemplate all other equivalent variations and do not restrict myself to unessential details or features of construction.

I claim:

1. In a dental appliance of the character described, a pair of overlapping members arranged for concentric movement, arms in connection with said members respectively, movable toward and away from each other by the concentric movement of said members, means in connection with the arms for holding a strand of dental floss, and a device in connection with the arms between said means and said members for effecting concentric movement of said members to move said arms both toward and away from each other.

2. In a dental appliance of the character described, a pair of juxtaposed members arranged for concentric movement, a magazine formed by said members, a spool of dental floss in said magazine, arms attached to said members respectively and being movable toward and away from each other by the concentric movement of said members, means for holding the dental floss in connection with the ends of said arms, and a device between said means and said members for moving said members concentrically to move the arms away from each other and stretch the dental floss, and toward each other to relax the dental floss.

3. In a dental appliance of the character described, the combination with a pair of concentrically movable members, and a spool of dental floss between said members, of an arm in connection with each of said members projecting beyond the body portion thereof, means on the projecting ends of said arms for engaging with and holding a strand of the dental floss, and a device in connection with said arms between said means and said members for moving said arms relatively to each other and turning said concentrically movable members and thereby stretching the floss held in the projecting ends of the arms.

4. In a dental appliance of the character described, the combination with concentrically movable members, and a quantity of dental floss carried thereby, of an arm projecting from each of said members, overlapping flanges on said arms respectively, means for holding the dental floss in connection with the ends of said arms, and an element in connection with said flanges operable to move said arms toward and away from each other to stretch and relax the dental floss connected thereto and to turn the concentrically movable members relative to each other.

5. In a dental appliance of the character described, the combination with a magazine composed of two juxtaposed relatively movable members, of a spool of dental floss carried in the magazine, an arm rigid with and projecting from each of said members, means at the end of each arm for engaging and holding a strand of the dental floss, and an element supported between said means and said members coöperating with said arms for moving said arms away from each other to stretch the dental floss, and toward each other to relax the dental floss.

6. In a dental appliance of the character described, the combination with a magazine composed of two juxtaposed relatively movable members, and a quantity of dental floss inclosed in said magazine, of an arm rigid with each of said members, means at the ends of said arms for engaging and holding the dental floss, overlapping flanges in connection with said arms, and an element coöperating with said flanges to turn said members relatively and move said arms to stretch and relax the dental floss.

7. In a dental appliance of the character described, the combination with the magazine, of a spool of dental floss held therein, arms rigid with the magazine, engaging means on the arms for holding a strand of the dental floss, overlapping flanges in connection with said arms each being provided with a slot, and a device operating in said slots in said flanges to move said arms toward and away from each other to stretch and relax the dental floss.

8. In a dental appliance of the character described, the combination with the magazine, of a spool of dental floss held therein, a pair of arms rigid with the magazine, engaging means on the arms for holding a strand of the dental floss, a device coöperating with the arms to move said arms away from each other to stretch the dental floss and toward each other to relax the dental floss, and means for limiting movement of said arms.

9. In a dental appliance of the character described, the combination with a magazine composed of two juxtaposed members arranged for concentric turning movement, of a spool of dental floss supported by said members coaxially therewith, an arm rigid with each of said members, engaging means on the arms for holding a strand of the dental floss, and means movably connected with the arms for moving the arms positively to stretch and relax the dental floss.

10. In a dental appliance of the character described, the combination with two juxtaposed members arranged for concentric turning movement and having matching recesses therein forming a magazine, of a spool of dental floss mounted in said magazine coaxially therewith, an arm attached to each of said members, engaging means on the arms for engaging a strand of the dental floss, and a manually movable device supported by said arms operable to move said arms positively as required to stretch and relax the dental floss.

11. In a dental appliance of the character described, the combination with two juxtaposed members arranged for concentric turning movement, means for supporting a spool of dental floss by said members coaxially therewith, an arm extending from each of said members, means on the ends of the arms for holding a strand of the dental floss, and means in connection with said arms for holding said members juxtaposed and for moving said arms positively to stretch and to relax the dental floss.

12. In a dental appliance of the character described, the combination with two juxtaposed members arranged for relative turning movement, and a spool of dental floss supported between said members, of an arm extending from each of said members, overlapping flanges in connection with said arms, each of said flanges having a slot extending in a plane different from the plane of the slot in the other arm, an element arranged to slide in said slots to move said arms toward and away from each other, and to effect relative turning movement of said two members, and means in connection with the ends of said arms for holding a strand of the dental floss.

13. A dental appliance of the character described, comprising two juxtaposed members each composed of a portion having a recess therein matching the recess in the other member, an arm extending from each member, a flange on each member arranged to overlap the flange on the other member and having a slot therein, and means in connection with the end of the arm for engaging and holding a strand of the dental floss; an element operating in said slots for moving said arms to stretch and to relax the dental floss; and a spool of dental floss mounted in the space formed by the matching recesses in said members, from which the strand of dental floss attached to the end of said arms may turn.

14. In a dental appliance of the character described, the combination of a magazine formed of two overlapping parts arranged for concentric turning movement and including a magazine adapted to hold a spool of dental floss and having openings through which the spool may be engaged by the fingers, a spool of dental floss in said magazine coaxially therewith, an arm in rigid connection with each of said parts, means for attaching a strand of the dental floss to the ends of said arms, overlapping flanges in connection with said arms having slots therein and an element mounted in said slots and arranged to hold said parts in connection with each other and being movable in said slots to move said arms effectively to stretch and relax the dental floss.

15. In an appliance of the character described, the combination with a magazine composed of two duplicate juxtaposed, relatively movable members, of a spool of dental floss carried in the magazine, an arm rigid with and projecting from each of said members, means at the end of each arm for engaging and holding a strand of the dental floss, and a device supported by said arms for holding said members in connection with each other and for controlling the movement of said arms.

16. In an appliance of the character described, the combination with a magazine composed of two duplicate juxtaposed members arranged for concentric turning movement, and means for holding said members in proper positions relative to each other at all times, of a spool of dental floss carried in the magazine, an arm rigid with and projecting from each of said members, said arms being movable toward and away from each other by turning movement of said members, means at the end of each arm for engaging and holding a strand of the dental floss, and means for imparting turning movement to said members to move the arms and thereby stretch the dental floss in engagement with the ends of said arms.

BIRNEY DYSART.

Copies of this patent may be obtained for five cents each, by addressing the "Commissioner of Patents, Washington, D. C."